Dec. 24, 1940. W. C. ANDERSON 2,226,088
CIRCUIT BREAKER FOR FEEDER DISTRIBUTION SYSTEMS
Filed June 18, 1938
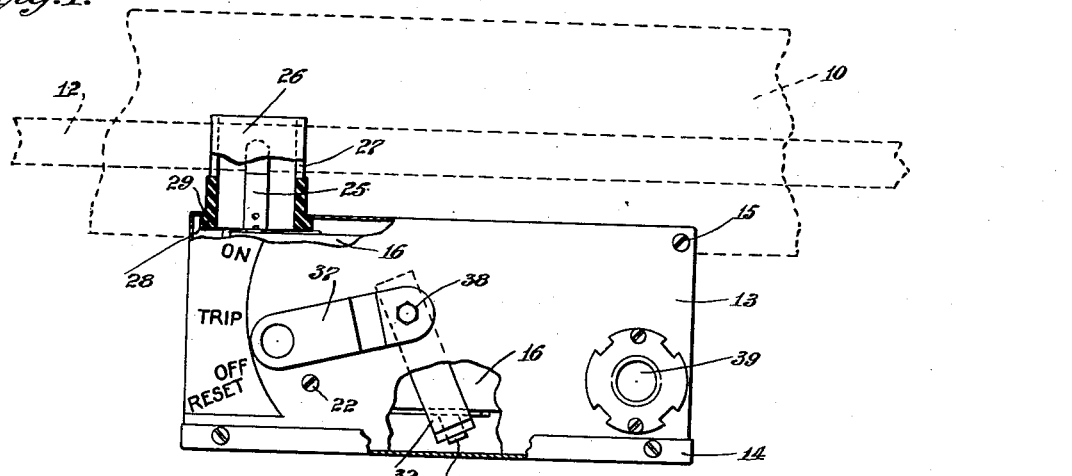
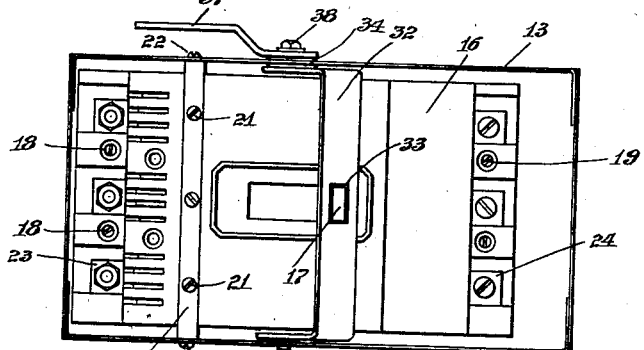
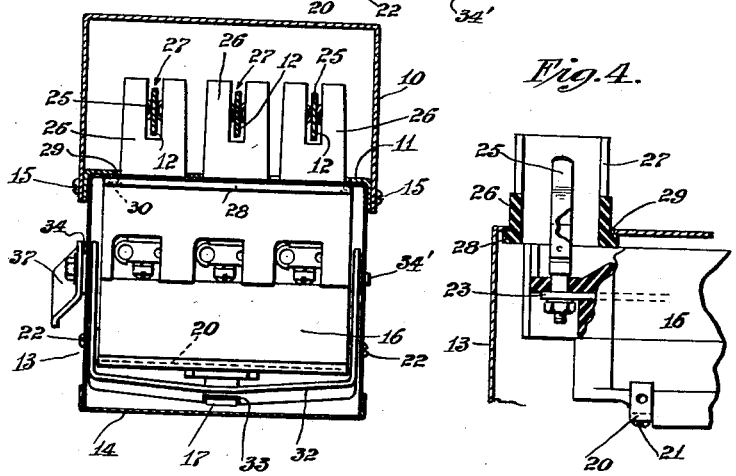
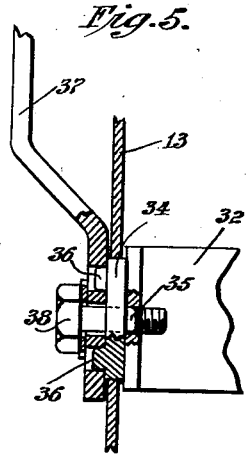
INVENTOR
William C. Anderson
BY
ATTORNEY Patented Dec. 24, 1940

2,226,088

UNITED STATES PATENT OFFICE 2,226,088

CIRCUIT BREAKER FOR FEEDER DISTRIBUTION SYSTEMS

William C. Anderson, Bromley, Ky., assignor to The Trumbull Electric Manufacturing Company, Plainville, Conn., a corporation of Connecticut Application June 18, 1938, Serial No. 214,484

2 Claims. (Cl. 200—51)

My invention relates particularly to enclosed bus bar or duct systems of power distribution.

The main object is to provide a simple but rugged and reliable mechanism for opening and closing a circuit leading to a branch circuit.

Another object is to provide a device which makes it possible to use a more or less standard type of circuit breaker.

Another object is to provide an enclosed switch for branch circuits which can be readily applied to duct or conduit system of distribution.

In carrying out the invention I employ a simple type of box adapted to enclose an assembled circuit breaker unit. The circuit breaker or switch unit is detachably secured in the box and its operating lever is connected to a manually operable device, a part of which projects from the box. The switch unit is provided with special terminals in the form of stabs or blades adapted to be inserted into the bus bar duct and to engage the bus bars therein. Arc suppressing means are provided around the contact members where they engage the bus bars.

Fig. 1 is a side view of a device embodying my invention, parts being broken away and in dotted lines showing an associated bus bar duct.

Fig. 2 is a view of the underside of the device, the cover being removed.

Fig. 3 is a sectional view looking from right to left in Fig. 1.

Fig. 4 is a sectional view showing the contact members.

Fig. 5 is a detailed view showing a bearing for the operating member.

The conduit or duct 10 may be of any suitable construction and in the form shown is provided at the bottom plate 11 with overlapping flanges. The bus bars 12 may be of any suitable type.

The box 13 may be of very simple construction with a cover 14 adapted to be suitably secured thereto. The box is adapted to be secured to the flanges of the duct, for instance by one or more screws such as 15.

The circuit breaker or switch may be of any suitable type, for instance having an insulating body 16 enclosing the switch mechanism and having an operating handle or finger piece 17 by which it may be actuated in the normal way.

The body of this circuit breaker is secured in place for instance by a number of screws 18 and 19 at opposite ends of the base. I also provide a cross bar 20 of metal which is secured by screws 21 to the insulating body or housing of the switch unit. This cross bar is secured at its ends to the side walls of the box by means of screws 22 so as to assist in steadying the switch unit and holding it securely in place and at the same time stiffening or reenforcing the side walls of the box.

This switch unit has terminals such as 23 and 24 of the usual type at opposite ends. To each of the terminals 23 is secured a switch contact or jaw 25 adapted to engage a bus bar 12 when the device is attached to the bus bar duct.

In order to minimize the danger from arcing in case the device is removed from the duct while current is still flowing, I prefer to provide a number of tubular members 26, each of which partially surrounds one of the contact members 25 and is slotted at 27 to clear the associated bus bar. These arc suppressors are all preferably molded integral with a plate 28. The bottom of the box 13 is provided with a number of openings 29 through which these arc suppressors 26 extend. The plate 28 may be secured to the bottom of the box by screws 30 and the body of the switch member 16 is held against the plate 28 by the screws 18 when employed and by the cross bar 20.

In order to operate the switch or circuit breaker when the cover 14 is closed I provide a yoke 32 which is hinged to the side walls of the box and has a slotted or recessed portion 33 which engages the handle or finger piece 17 of the circuit breaker mechanism. One end of the yoke 32 has a hinge pin 34' which has a bearing in one wall of the box. The other end of the yoke 32 is connected to a disc 34 which is mounted in a side wall of the box. This disc 34 has projections 35 which extend into recesses in the yoke 32. The disc 34 also has other projections 36 which extend into the handle member 37 on the outside of the box. The handle member, bearing disc 34 and adjacent end of the yoke 32 are all secured together by means of a screw or bolt 38.

The switch or circuit breaker may therefore be operated by means of the external handle 37 to turn on and off the current to the branch circuit.

It should be understood that a branch conductor cable or conduit may be secured to the box 13 in any suitable manner as for instance by removing the knock-out 39. Such entrance device of course may be provided in any number and at any suitable location in the box.

This form of device combines the advantages of the switching mechanism and the fuseless automatic over-current protective feature in the form of a circuit breaker built into a metal case suitable for insertion into a feeder distribution system.

It will be seen that the arc suppressor 26 is supported or backed up by the casing or body of the switch or circuit breaker and that the cross bar 20 not only reenforces the box but assists in taking up the thrust when the contact jaws or stops 25 are moved into engagement with the bus bars in the duct. As the stabs are supported directly by the insulating body of the circuit breaker no separate block is required. This not only saves space but greatly simplifies the construction and the assembly of the parts.

I claim:

1. A bus duct switch including a box adapted to be secured to a duct, a circuit breaker having an insulating body detachably mounted in the box and having an operating lever projecting at the front inside of the box, a U-shaped yoke pivoted in the sides of the box and having a recess detachably receiving the tip of the lever, an operating handle pivoted to the outside of the box and connected to the yoke inside of the box and a cover for the box removable without disturbing the switch and its lever, the circuit breaker being operable independently of the cover and a bus bar engaging stab fixedly connected to the circuit breaker independently of the circuit conditions.

2. A bus duct connector including a box for attachment to a bus bar duct and having a removable cover to permit access to the box, a circuit breaker mounted in the box and having two sets of circuit terminals and an operating member, bus-bar engaging stabs secured to the circuit breaker and connected to one set of its terminals and projecting from one face of the box for insertion into a bus duct to engage bus bars therein, branch circuit connections for the opposite set of terminals of the circuit breaker, a yoke hinged to the opposite side walls of the box and detachably connected to the operating member of the circuit breaker, an operating handle pivoted to one side wall of the box and connected to the yoke for operating the circuit breaker and a cover for the box removable independently of the operating handle of the circuit breaker, the circuit breaker being operable independently of the cover and independently of the stabs.

WILLIAM C. ANDERSON.